May 5, 1953

C. R. BROWN ET AL 2,637,163

JET ENGINE VARIABLE AREA EXHAUST NOZZLE

Filed April 26, 1951

INVENTORS
CHARLES R. BROWN
WILLIAM H. LEEDECKE
BY
Ralph T. French
ATTORNEY

Patented May 5, 1953

2,637,163

UNITED STATES PATENT OFFICE 2,637,163

JET ENGINE VARIABLE AREA EXHAUST NOZZLE

Charles R. Brown, Glen Mills, and William H. Leedecke, Yeadon, Pa., assignors to Westinghouse Electric Corporation, East Pittsburgh, Pa., a corporation of Pennsylvania Application April 26, 1951, Serial No. 223,110

3 Claims. (Cl. 60—35.6)

This invention relates to jet propulsion power plants, more particularly to such power plants which are equipped with variable area exhaust nozzles, and has for an object to provide improved apparatus of this character.

With some prior variable area exhaust nozzle constructions, particularly those of the eyelid type, trouble has resulted from excessive leakage of hot exhaust gases between the fixed and the movable members of the nozzle, resulting in "blow-by" or "blow-back." Excessive blowback may cause air frame overheating as well as drop in performance of the power plant and reduction in life of the parts of the exhaust nozzle.

The present invention prevents such excessive leakage of hot gases and comprises a slotted construction of the fixed nozzle to provide terminal flaps. The slots are overlapped by similar, but circumferentially-staggered, flaps formed by slotting a surrounding band or casing. Exhaust gas pressure within the nozzle holds the flaps against the eyelids, thereby preventing "blow-by" or "blow-back." The slotted construction produces sufficient flexibility to permit the flaps to adjust to any irregularities or workings of the eyelid members.

Accordingly, another object of the invention is to provide a flexible seal between stationary and movable members of a variable area exhaust nozzle.

Another object of the invention is to provide an expandable and contractible seal between stationary and moving members of a variable area exhaust nozzle.

These and other objects are effected by the invention as will be apparent from the following description and claims taken in connection with the accompanying drawing, forming a part of this application, in which:

Figure 1:
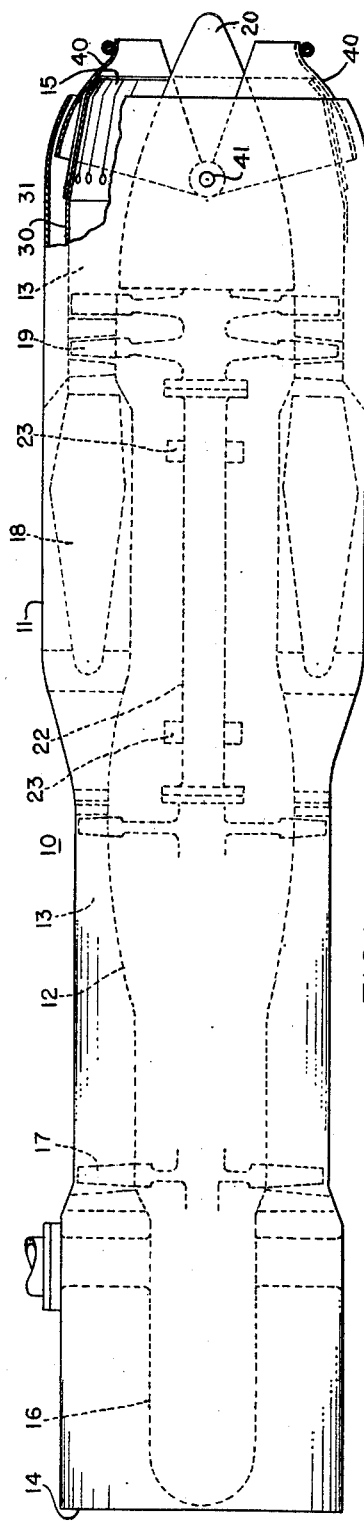
Fig. 1 is a side elevational view of a gas turbine power plant incorporating the invention.

The aircraft power plant 10, shown for purposes of illustration only, comprises an annular outer casing 11 and a composite inner core structure 12 coaxial therewith, the two being radially spaced to provide therebetween an annular passage 13 for flow of air and gases substantially straight through from an inlet 14 at the front, or left as viewed in Fig. 1, to an exhaust nozzle 15 at the rear or opposite end.

The composite core structure may include a fairing cone 16 at the inlet end, an axial flow compressor 17, combustion apparatus 18, a gas turbine 19 and a tailcone 20. The turbine 19 may be connected to the compressor 17 and drive the latter through shaft 22 journaled in suitable bearings 23.

A power plant of this type operates in accordance with well-known principles which may be summarized as follows: Air entering the inlet 14 is compressed by the compressor 17 and passes to the combustion apparatus 18 where its temperature is raised by combustion of fuel therein. The heated air and hot products of combustion are expanded through the blading of the turbine 19 to motivate the latter and therethrough the compressor 17. The exhaust from the turbine discharges from the power plant through the exhaust nozzle 15 in the form of a jet for propelling the aircraft in, or on which, the power plant is mounted.

Figure 3:
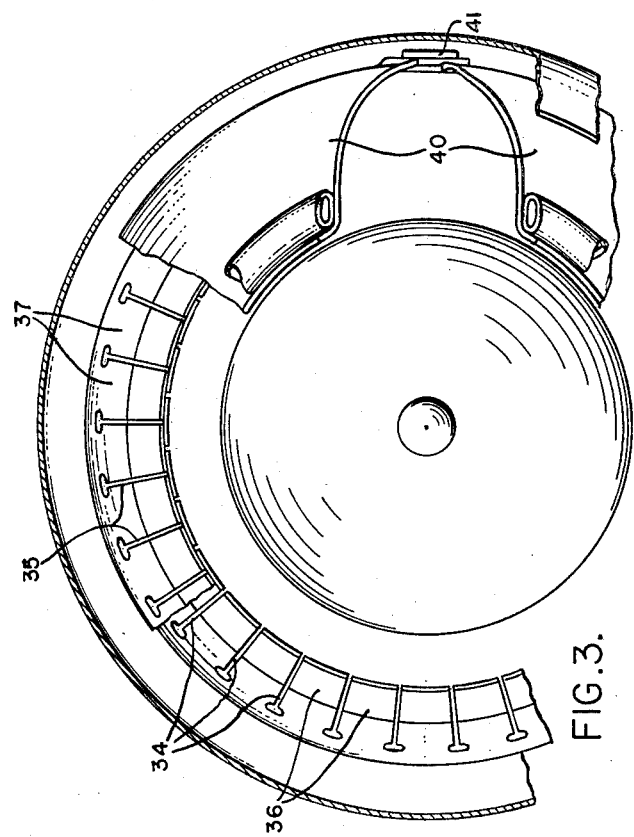
Fig. 3 is an enlarged fragmentary end view of the variable area exhaust nozzle shown in Fig. 1.
Figure 2:
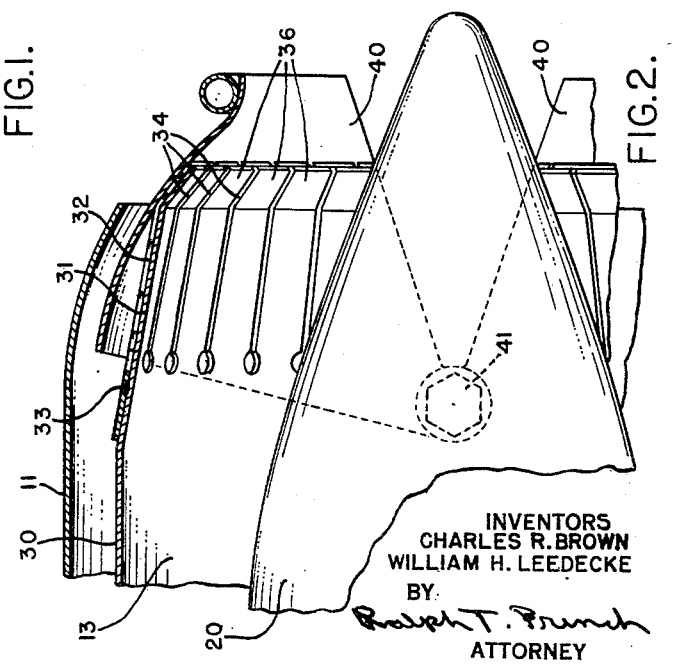
Fig. 2 is an enlarged fragmentary view, partially in section, of the novel sealing structure.

The present invention is concerned with the exhaust nozzle 15, which is shown in detail in Figs. 2 and 3.

An inner annular wall 30 cooperates with the tailcone 20 to define the downstream portion of the annular gas flow passage 13. The downstream portion 31 of the annular wall 30 is surrounded, in juxtaposed relation, by an outer band or wall 32, the two walls being welded to each other near the upstream end of the outer wall 32, as at 33.

Both walls 30 and 32 are slotted longitudinally from their downstream terminal edges, as at 34 and 35, respectively, the slots 34 being staggered circumferentially relative to the slots 35, with the result that slots 34 of the inner wall 30 are covered by flaps 37 of the outer wall 32 while the slots 35 of the outer wall 32 are covered by the flaps 36 of the inner wall.

Inasmuch as the two sets of flaps 36 and 37 are unconnected to each other, except for the weld at 33 upstream thereof, the double-wall flap construction is sufficiently flexible to expand and contract a limited amount to engage at all times the inner surfaces of a pair of nozzle eyelids 40 pivotally mounted on the casing 30, as at 41. These nozzle eyelids 40 may be conventional in structure and mode of operation, and hence a detailed description thereof is deemed unnecessary. It should be sufficient to state that they may be moved, at the will of the pilot or automatic control, between a first limit where the effective exhaust nozzle area is a maximum and a second position where the effective exhaust nozzle area is a minimum or any intermediate position.

At all positions of the eyelids 40 between these limits the slotted double wall terminal portion engages the inner surfaces of the eyelids to effectively seal against leakage or "blow-back" of exhaust gases between the double wall 30—32 and the eyelids.

While the invention has been shown in but one form, it will be obvious to those skilled in the art that it is not so limited, but is susceptible of various other changes and modifications without departing from the spirit thereof.

What is claimed is:

1. A variable area exhaust nozzle for a jet propulsion power plant, comprising a first annular wall structure including a terminal portion slotted longitudinally from its downstream edge, considered in the direction of flow of exhaust gases through the nozzle, a second annular wall structure surrounding the slotted terminal portion of the first annular wall structure in juxtaposed relation thereto, said second annular wall structure likewise being slotted longitudinally from its downstream edge, the slots of each wall structure being staggered circumferentially with respect to the slots of the other wall structure, whereby the slots of the first annular wall structure are covered by the material of the surrounding second wall structure, and a plurality of eyelid-type nozzle adjusting elements mounted for pivotal movement relative to the downstream edges of the first and second annular wall structures between a first limit of maximum effective exhaust nozzle area and a second limit of minimum effective exhaust nozzle area, said nozzle-adjusting elements being sealingly engaged by the slotted terminal portions of the juxtaposed annular wall structures in all positions of their pivotal movement.

2. A variable area exhaust nozzle for a jet propulsion power plant, comprising an annular two-ply wall structure slotted longitudinally from its downstream end, considered in the direction of flow of exhaust gases through the nozzle, the slots of one ply being staggered circumferentially relative to the slots of the other ply, whereby the slots of each ply are covered by the material between the slots of the other ply, means uniting the two plys upstream of the slots only, and a plurality of nozzle area adjusting elements mounted externally of the annular wall structure for pivotal movement relative to the downstream terminal portion of said wall structure, between a first position of maximum effective exhaust nozzle area and a second position of minimum effective exhaust nozzle area, the slotted construction of the downstream portion of the annular two-ply wall structure providing for outward movement of the latter into sealing contact with the nozzle area adjusting elements under pressure of exhaust gases flowing through the nozzle.

3. A variable area exhaust nozzle for a jet propulsion power plant, comprising an inner annular casing providing a flow passage for hot exhaust gases, an outer annular casing surrounding in juxtaposed relation the downstream portion of the inner annular casing, considered in the direction of flow of exhaust gases through said passage, means securing the upstream portion of the outer casing to the inner casing with the downstream portions of the two casings abutting but unsecured to each other, a plurality of nozzle area adjusting elements mounted exteriorly of said casings for movement between a first limit of maximum effective exhaust nozzle area and a second limit of minimum effective exhaust nozzle area, the abutting unsecured downstream portions of the two casings being slotted axially from their downstream edges with the slots of each casing staggered circumferentially relative to those of the other casing, whereby they are rendered sufficiently flexible to be expanded outwardly into sealing engagement with the nozzle area adjusting elements by pressure of exhaust gases in the flow passage.

CHARLES R. BROWN.
WILLIAM H. LEEDECKE.

References Cited in the file of this patent

UNITED STATES PATENTS

| Number | Name | Date |
|---|---|---|
| 851,603 | Long | Apr. 23, 1907 |
| 2,494,659 | Huyton | Jan. 17, 1950 |
| 2,551,372 | Haltenberger | May 1, 1951 |
| 2,569,996 | Kollsman | Oct. 2, 1951 |

FOREIGN PATENTS

| Number | Country | Date |
|---|---|---|
| 615,915 | Great Britain | Jan. 13, 1949 |